United States Patent
Lange et al.

[11] 3,733,668
[45] May 22, 1973

[54] METHOD FOR PRODUCING A SLIDING BEARING FOR A UNIVERSAL JOINT

[75] Inventors: Günther Lange, Siedlung Gluckkauf; Jürgen Ulderup, Haldem, both of Germany

[73] Assignee: Lemforder Metallwaren AG, Lemforde/Hann., Germany

[22] Filed: Apr. 10, 1972

[21] Appl. No.: 242,852

Related U.S. Application Data

[62] Division of Ser. No. 152,082, June 11, 1971.

[52] U.S. Cl.............................29/149.5 NM, 29/436
[51] Int. Cl.....B21d 53/00, B23p 11/00, B23p 19/00
[58] Field of Search............29/149.5 NM, 149.5 PM, 29/436, 149.5 R, 148.4 A

[56] References Cited

UNITED STATES PATENTS 3,000,089  9/1961  Baker et al..............................29/436
3,089,232  5/1963  Knight..........................29/149.5 NM

*Primary Examiner*—Thomas H. Eager
*Attorney*—John J. McGlew and Alfred E. Page

[57] ABSTRACT

The sliding bearing includes an outer cup-shaped thin metal bearing bush seated in the ends of a fork of the universal joint, and an inner sliding bush, of abrasion and oil resistant plastic composition material, embracing each pin of the universal joint, there being a predetermined clearance between the inner and outer bushes. The plastic inner bush is formed by pouring around a cylindrical core inserted into the outer bush. The plastic bush, when it sets, shrinks to disengage its outer surface from the inner surface of the outer bush, and has a gripping fit with the pin of the joint. In this embodiment also the outer bush has an in-turned flange at its open end.

4 Claims, 3 Drawing Figures

3,733,668

METHOD FOR PRODUCING A SLIDING BEARING FOR A UNIVERSAL JOINT

This is a division of application Ser. No. 152,082 filed June 11, 1971.

BACKGROUND OF THE INVENTION

In particular for support of the star pins of universal joints, there are frequently used bearings including a thin-walled steel bearing bush serving as a bearing housing which can be produced simply and inexpensively by non-cutting shaping, such as by drawing. Drawn bearing bushes have smooth surfaces and require no refinishing, and thus are particularly suitable for economical mass production, as well as being light in weight.

However, in universal joints, the bottom of such a bearing bush must transmit the axial thrust. In a known manner, the transmission of this thrust is effected by having the end face of the cross pin of the universal joint directly engage the bottom or base of the bearing bush. This requires that the surfaces sliding on each other must be tempered and ground to secure good running conditions, and thus requires additional machining.

The sliding inner bearing bush is made of a plastic composition, which is preferably abrasion and oil resistant. In order to produce such joints as simply and inexpensively as possible, efforts have been made to eliminate the precision machining of the bearing surfaces of the joint elements as far as possible, or at least to reduce the amount of precision machining.

To this end, the plastic sliding bushes used for the bearing are formed by injecting the plastic into an annular space between the metallic bearing elements, or introduced into the annular space in any other way, with the objective of providing an adhesive bond between the outer circumferential surface of the sliding bush and the inner surface of the outer metallic bearing bush. In this case, the inner circumferential surface of the plastic bush forms a sliding surface with respect to the part to be supported.

However, such a sliding bearing has various disadvantages. When a plastic composition material is used as a sliding layer, it has been found that an adequate adhesive bond between this material and the metal surface of the outer bearing element cannot be attained without additional measures. At least the metal surface must be roughened, or must be provided with depressions or openings, in order to anchor the molded plastic more or less firmly. This requires, however, a corresponding machining of the parts, so that the production of the bearing as well as its assembly become rather complicated and expensive.

Another disadvantage of these bearings is that an exact or predeterminable bearing clearance between the sliding surfaces cannot be attained readily, due to the cross-sectional changes of the bearing material caused by the cooling of the plastic. That is, there is no exact and uniform support on the entire bearing surface of the pin.

SUMMARY OF THE INVENTION

This invention relates to sliding bearings, particularly for universal joints in the shifting and steering mechanisms of motor vehicles, and, more particularly, to an improved method of producing a sliding bearing of the type including an outer cup-shaped metal bearing bush and an inner sliding bush of plastic composition material embracing a pin of the universal joint.

The objective of the invention is to provide a simple and inexpensive sliding bearing for the transmission of radial and axial forces, and which can be easily and inexpensively produced. In addition, the objective is to produce such a sliding bearing eliminating harmful deformation of the bearing surfaces and which meets, in addition to favorable load conditions for the bearing elements, the requirement of an exact and predeterminable bearing clearance between the sliding surfaces.

In accordance with the invention, the necessary bearing clearance between the sliding parts, on the one hand, and a sufficiently firm fit of the sliding bush on the part to be supported, on the other hand, such as, for example, a universal joint pin, is produced by utilizing the shrinking action of the plastic forming the sliding bush.

The production of this embodiment of the sliding bearing is effected by injecting or pouring the plastic, for the sliding bush, into an annular slot formed by the outer bearing bush and a cylindrical mold core inserted thereinto. The injection or pouring is effected in such a way that the molded piece disengages itself from the inner surface of the outer bearing bush, which serves as a mold wall, due to the shrinkage caused by cooling of the plastic, and is pressed, with a smaller diameter than the mold core, after removal of the latter, together with the bearing element with initial stress on the part to be supported. This embodiment of the sliding bearing has various advantages.

One advantage is that an exact and predetermined bearing clearance can be achieved, despite the inexpensive production cost of the bearing, merely by a corresponding selection of the bearing pin diameter, the diameter of the pin to be supported being smaller, equal to, or larger than the range of the shrinkage allowance of the sliding bush than the diameter of the cylindrical mold core used during injection of the plastic. With the same pin diameter, identical bearings thus have always the same bearing clearance, the bearing tolerance being substantially equal to the pin tolerance.

Another important advantage arises from the fact that a sufficiently firm fit of the sliding bush on the pin is attained by utilizing the high shrinkage of the plastic as a result of the high coefficient of thermal expansion, so that additional anchoring is not required. The shrinking of the plastic furthermore has the effect that the necessary bearing clearance between the inner surface of the outer bearing bush and the outer surface of the sliding bush is formed. That is, the sliding surfaces are moved further outwardly from the pin to be supported, which leads to a considerable reduction of the specific loading of the sliding surfaces. For example, with a bearing pin with a diameter of 13 mm and a wall thickness of the sliding bush of 2 mm, the specific load of the sliding surfaces would be reduced by about 24 percent.

Considered from the standpoint of less expensive production of sliding bearings, there is a particular advantage in using a thin-wall metal bearing bush as an outer bearing bush, as this can be produced at low cost without cutting by deep drawing and with completely smooth surfaces, since no refinishing is required.

For performing the method of the invention, it is furthermore advantageous to flange at least one end, and preferably both ends, of the outer bearing bush before the plastic is introduced, and in such a way as to form, together with the cylindrical molding die, a closed mold chamber.

An object of the invention is to provide an improved method of producing a sliding bearing particularly adapted for use in universal joints in shifting and steering mechanisms of motor vehicles.

For an understanding of the principles of the invention, reference is made to the following description of typical embodiments thereof as illustrated in the accompanying drawing.

DESCRIPTION OF THE PREFERRED EMBODIMENTS

Figure 1:
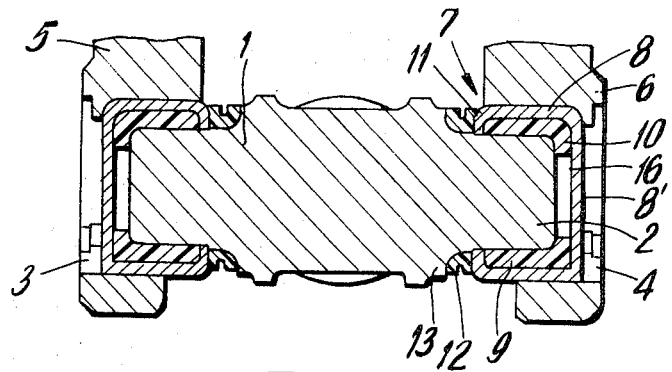
FIG. 1 is a longitudinal sectional view through a universal joint pin illustrating one embodiment of a sliding bearing in accordance with the invention.

Referring to FIG. 1, the cross link 1 of a universal joint is supported, in a known manner, with its pin 2 engaged in bores 3 and 4 of respective fork ends 5 and 6 of a fork. The support of each pin 2 in a bore is provided by a sliding bearing 7 which consists of an outer bearing bush 8, of thin-walled steel, and of a sliding bush 9, of plastic composition material which is preferably abrasion and oil resistant. At its end facing the bottom wall 8' of bearing bush 8, bush 9 is formed with an inwardly projecting molded collar 10 which bears on bottom wall 8' and also against the bend of the associated pin 2. At its opposite end, sliding bush 9 is held in place by an in-turned flange or border 11 at the open end of bush 8. The sliding bush 9 is thus fixed on the associated universal joint pin 2, and the sliding surfaces comprise the facing surfaces of bushes 8 and 9.

For the purpose of packing, bearing 7 is provided with a ring 12 of suitable material which is arranged in an annular slot defined by flange border 11 of outer bearing bush 8 and a collar 13 on the associated pin 2.

Figure 2:
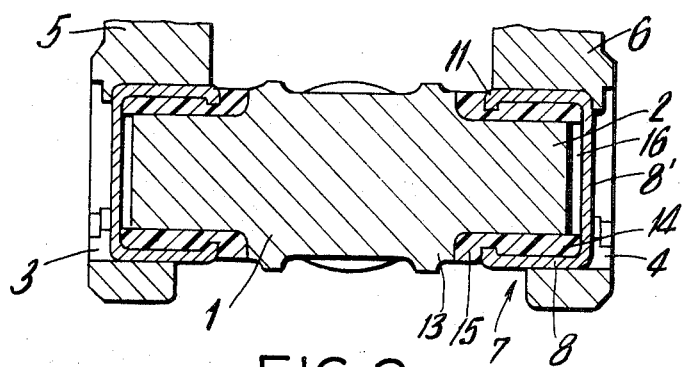
FIG. 2 is a view similar to FIG. 1 illustrating another embodiment of the plastic sliding bush.

Another embodiment of the invention is illustrated in FIG. 2, in which the plastic sliding bush is indicated at 14. Sliding bush 14, on its end remote from the bottom wall 8' of outer bush 8, extends beyond the flanged border 11 of bearing bush 8 and up to annular collar 13 on the associated pin 2, so that a portion of bush 14 also bears against flanged border 11 of metal outer bush 8. This portion 15 of plastic bush 14 also serves as a packing, so that additional packing means are not required. Bearing bush 14 is integral with section 15 and can be produced inexpensively as a one-piece molded element in a single operation.

In the embodiments of the invention shown in FIGS. 1 and 2, a free space 16 is provided between the end of a pin 2 and the bottom wall 8' of the associated outer bearing bush 8, for the purpose of receiving a lubricant such as grease.

Bearing bushes 9 and 14 preferably are formed from a more or less plastic composition material having good sliding properties, and which is abrasion-resistant as well as grease-resistant and heat-resistant. The plastic for forming the sliding bushes preferably is introduced into an annular chamber formed in the bearing in such a manner that each sliding bush is secured non-rotatably on the associated universal joint pin.

Figure 3:
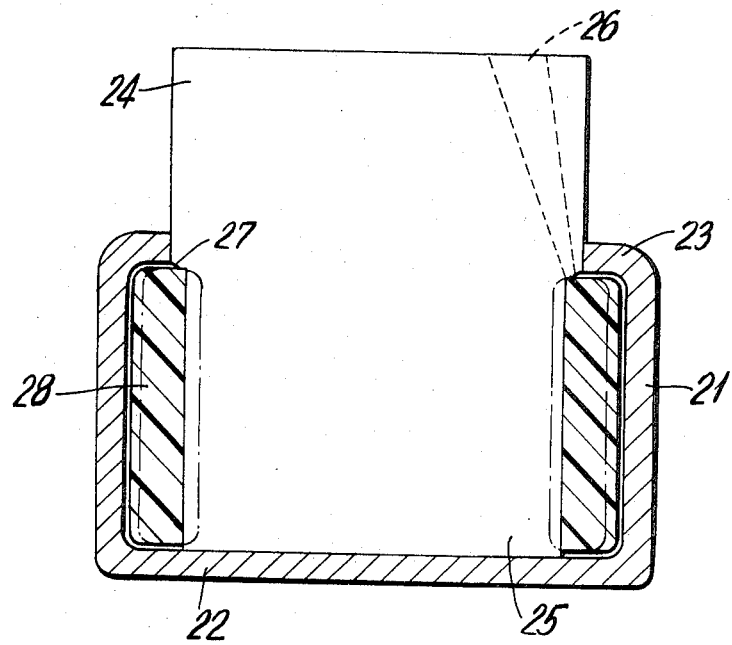
FIG. 3 is a sectional view, somewhat schematic, illustrating a third embodiment of the invention and its production.

FIG. 3 illustrates, in longitudinal section, a bearing that is open on one end. In this embodiment of the invention, which also is used primarily for supporting the pins of universal joints, the outer bearing bush is designated at 21 and forms, at the same time, the bearing housing for the other bearing elements. Bearing bush 21 comprises a thin-walled cup-shaped steel bush which is drawn without cutting, which is closed at one end by a bottom wall 22, and which is also tempered, if desired, after shaping, but which needs no refinishing.

In accordance with the invention, a cylindrical die 24 having a reduced end portion 25 is inserted into the opening bounded by the flanged border 23 of bearing bush 21. The annular cavity thus formed is closed at its upper end by flange 23 of bearing bush 21 which encloses die 24. Above the core lug 25 of die 24, there is formed a funnel-shaped inlet 26 which opens into the mold chamber on the transition surface 27 between the die and the core lug, and through which the liquid plastic is injected into the mold chamber.

When the mold chamber is filled with plastic and the plastic sets, a great shrinkage of the plastic material occurs during cooling of the plastic. Consequently, the molded piece, namely the sliding bush 28, disengages itself from the inner wall surface of metal bearing bush 21 and its diameter is decreased by the amount $a/2$ after extraction of the mold core 25. To use such a bearing bush, there can be mounted selectively therein bearing pins, of a universal joint, which have different diameters within the range of the shrinkage allowance, namely pins having diameters which are smaller, equal to, or larger than the diameter of the mold core 25.

When sliding bush 28 is pressed on a bearing pin in a single operation together with outer bearing bush 21, a firm shrink fit of sliding bush 28 is attained and, at the same time, there is provided a support of the universal joint pin with the desired exact bearing clearance $b/2$ between bearing bush 21 and sliding bush 28. This is effected in a simple manner, that is, without expensive refinishing and without the use of special means to ensure a good bearing fit. The assembly of the bearing also is very simple.

While specific embodiments of the invention have been shown and described in detail to illustrate the application of the principles of the invention, it will be understood that the invention may be embodied otherwise without departing from such principles.

We claim:

1. A method for producing a sliding bearing, of the type including an outer cylindrical metal bearing bush and an inner sliding bush of plastic composition material embracing a pin of the universal joint, comprising the steps of inserting a cylindrical mold core into the outer metal bearing bush to form, with the latter, an annular mold space; filling the annular mold space with plastic composition material in liquid form; the plastic composition material, upon setting, shrinking to disengage its outer cylindrical surface from the inner cylindrical surface of the outer metal bearing bush; removing the cylindrical mold core from the set plastic composition material, whereby the inner diameter of the annular plastic composition material molded bush decreases; and pressing the resultant inner sliding bush of plastic composition material with initial stress onto a pin of a universal joint, together with the outer bearing element.

2. A method, as claimed in claim 1, including the step of initially forming a radially inwardly extending flange on at least one end of the outer metal bearing bush so that the outer metal bearing bush forms, conjointly with the cylindrical mold core, a mold chamber.

3. A method, as claimed in claim 2, in which the outer metal bearing bush is a cup-shaped metal bearing bush having the radially inwardly projecting flange at its open end.

4. A method, as claimed in claim 2, including the step of forming the outer metal bearing bush by a drawing operation from a single piece of uncut metal.

* * * * *